United States Patent [19]

Owada et al.

[11] Patent Number: 4,667,249
[45] Date of Patent: May 19, 1987

[54] BINARIZING SYSTEM OF PICTURE IMAGE SIGNALS

[75] Inventors: Fumio Owada, Hachioji; Yukio Tsuda, Musashino, both of Japan

[73] Assignee: Kabushiki Kaisha Toshiba, Kawasaki, Japan

[21] Appl. No.: 709,729

[22] Filed: Mar. 8, 1985

[30] Foreign Application Priority Data

Apr. 28, 1984 [JP] Japan .................. 59-86333

[51] Int. Cl.⁴ .............................. H04N 1/40
[52] U.S. Cl. .................. 358/282; 358/284; 382/54
[58] Field of Search ............ 358/282, 284; 382/52, 382/53, 54

[56] References Cited

U.S. PATENT DOCUMENTS 3,534,334 10/1970 Bartz et al. ................ 382/52
4,442,544 4/1984 Moreland et al. ........... 382/53

OTHER PUBLICATIONS

IBM Technical Disclosure Bulletin, vol. 14, No. 4, 9/1971, pp. 1127-1128, *Video Thresholding for Optical Scanners*, Olsen.
IBM Technical Disclosure Bulletin, vol. 21, No. 6, 11/1978, pp. 2295-2297, *Improved Dynamic Thresholding Algorithm for Image Binarization*, Hancock.
IBM Technical Bulletin, vol. 24, No. 4, 9/1981, pp. 1821-1824, *Threshold Detector*, Schroeder.

*Primary Examiner*—Edward L. Coles, Sr.
*Attorney, Agent, or Firm*—Finnegan, Henderson, Farabow, Garrett & Dunner

[57] ABSTRACT

In a binarizing system wherein analog picture image signals produced by scanning a manuscript picture image is quantized and the quantized signals are converted into digital picture image signals which are binarized into signals representing black or white according to a predetermined threshold value, some picture image signals of picture elements on the same main scanning line as a picture element to be corrected and positioned before the picture element to be corrected among the digital picture image signals are selectively extracted, and at least one of the picture image signals whose level becomes a maximum or a minimum is further selected from the extracted picture image signals. The picture image signal thus selected is used as a reference signal showing the nature of tone of the manuscript picture image for subjecting the picture image signal of the picture image to be corrected to a calculation emphasizing the nature of tone of the picture image to be corrected in the manuscript picture image.

8 Claims, 12 Drawing Figures

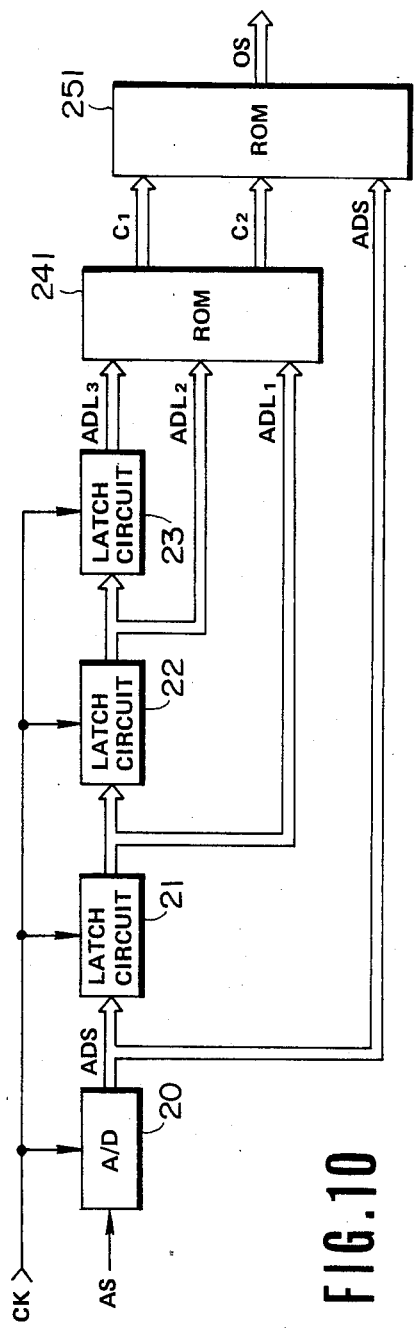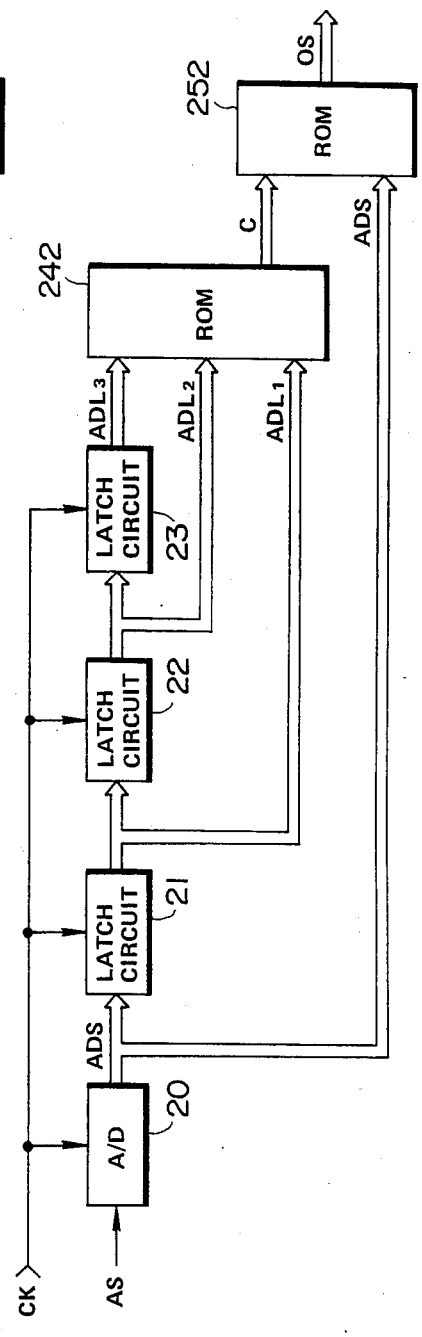

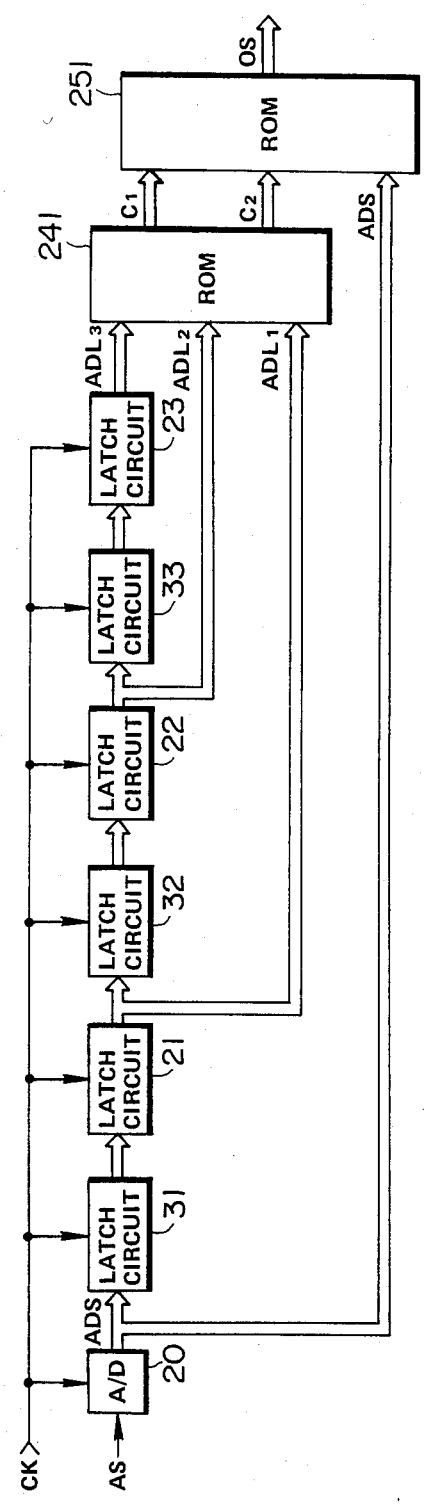

BINARIZING SYSTEM OF PICTURE IMAGE SIGNALS

BACKGROUND OF THE INVENTION

This invention relates to a binarizing system of picture image signals. In a facsimile device, for example, analog picture image signals produced by scanning a manuscript with a line sensor are binarized according to a predetermined threshold value. Generally, the level of the picture image signal varies depending upon such factors as the tone or concentration of the picture image, the thickness of lines, whether the lines are vertical or horizontal, states of surrounding picture images, or the like so that when the picture image signals are binarized as they are, it is impossible to obtain good image quality. For example, a fine black line in a white background, a continuous pattern of fine white and black lines, and a fine white line in a black background have different signal levels so that informations would be lost irrespective of the settings of threshold values as will be described later in more detail.

For this reason, in the prior art a correction circuit has been provided before the binarizing circuit for correcting contrast of the picture image signals. Although various types of correction circuits have been proposed, a satisfactory correction circuit is not yet available. For example, according to one type of correction circuit, where the difference in the signal levels of the picture image signals of adjacent picture elements and the picture image signal of a picture element to be corrected is small, substantially no correction is made, while for a picture image in which the level of the picture image signal varying slowly, that is, for a picture image whose contrast is vague, satisfactory correction could not be made.

SUMMARY OF THE INVENTION

Accordingly, it is an object of this invention to provide a novel binarizing system of picture images capable of preventing loss of picture images and effecting efficient correction even for picture images whose picture image signal levels vary slowly, thereby improving image quality.

According to this invention there is provided a binarizing system of a picture image comprising quantizing means for sequentially quantizing analog picture image signals produced by scanning a manuscript picture image of each picture element in accordance with a picture image clock; means for selectively extracting picture image signals of some picture elements on the same main scanning line as a picture element to be corrected and preceeding to the picture element to be corrected out of the quantized picture image signals; calculating means executing a first calculation for selecting either one of the extracted picture image signals whose levels are a maximum and a minimum, and a second calculation for effecting a level correction on the picture image signal of the picture element to be corrected for emphasizing the nature of the tone of the picture image in the manuscript based on the level of the picture image of the picture element to be corrected.

According to this system, information regarding the nature of the tone of the manuscript picture image can be obtained more correctly whereby when the picture image signals of the picture element to be corrected in a picture image are corrected relatively in accordance with this information, they can reproduce the nature of the tone of the picture element at a higher fidelity when binarized according to a predetermined threshold value. For this reason even a picture image whose picture image signal level varies slowly can be corrected efficiently.

Since the level correction is effected for respective picture element units of the quantized picture image signals even when a phenomenon resulting in a loss of one picture element is caused by a temporal over correction, there is no fear of causing loss of picture image that can be seen as in the prior art level correction circuit. Before executing a calculation necessary for the level correction, a certain number of the picture image signals of picture elements before the picture element to be corrected are extracted, and at least one of the extracted picture image signals, whose level is a maximum or a minimum is preselected so that the binarizing system of this invention can be fabricated with a simple hardware circuit, thereby increasing the speed of signal processing.

BRIEF DESCRIPTION OF THE DRAWINGS

In the accompanying drawings:

FIG. 8 is a block diagram showing one example of a level correction circuit utilized in a binarizing system embodying the invention;

FIGS. 10 and 11 are block diagrams showing other embodiments of the level correction circuit according to this invention.

DESCRIPTION OF THE PREFERRED EMBODIMENTS

Figure 1:
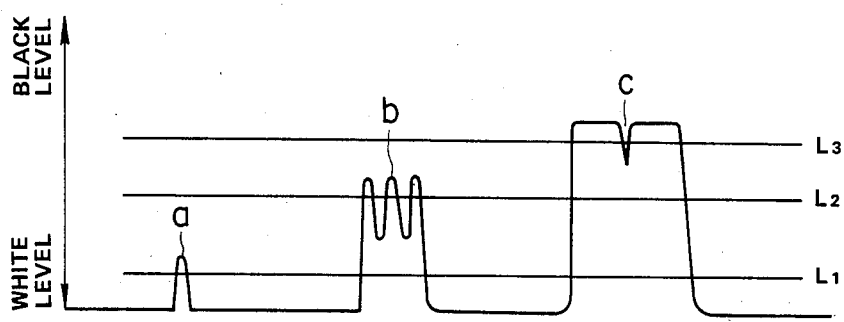
FIG. 1 shows one example of signal waveforms of picture image signals.

Before describing the preferred embodiments of this invention, prior art level correction circuits will first be described. Where it is desired to binarize analog picture images according to predetermined threshold values, it has been difficult to obtain binarized picture image signals having a high reproduceability. For example, as shown in FIG. 1, a fine black line a in a white background, a continuous pattern b of fine white and black lines, and a fine white line c in a black background have different signal levels so that irrespective of the setting of the threshold values of $L_1$, $L_2$ and $L_3$ certain information would be lost so that it has been impossible to obtain all information.

Figure 2:
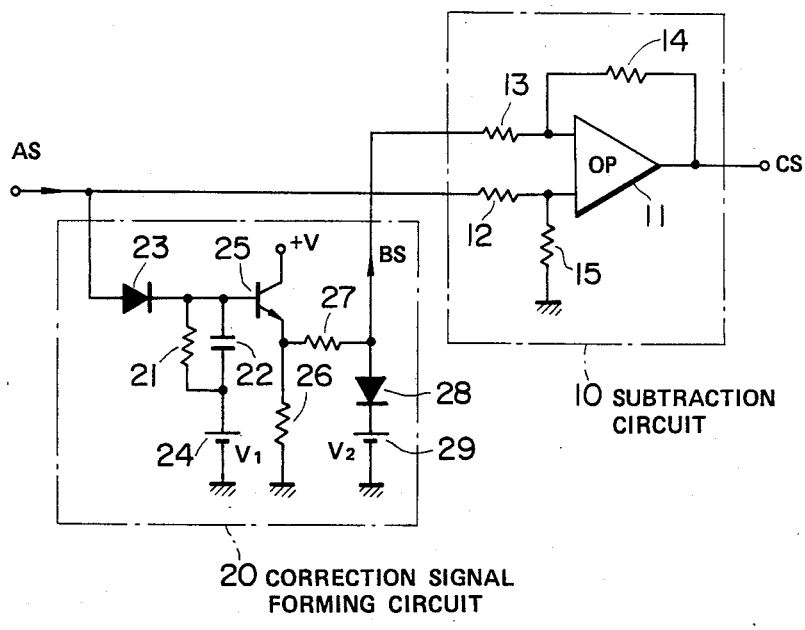
FIG. 2 shows one example of a prior art level correction circuit.
Figure 3:
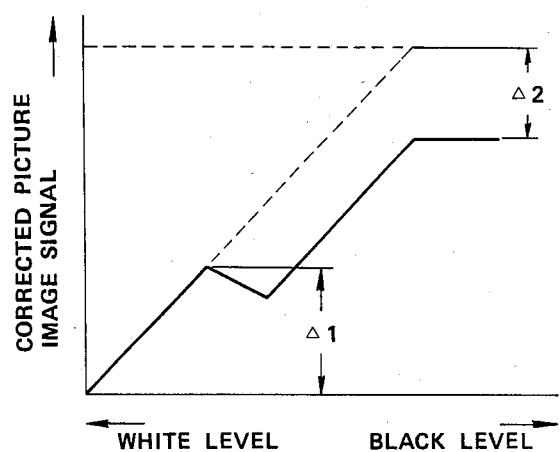
FIG. 3 is a graph showing the input/output characteristic of the circuit shown in FIG. 2.
Figure 4:
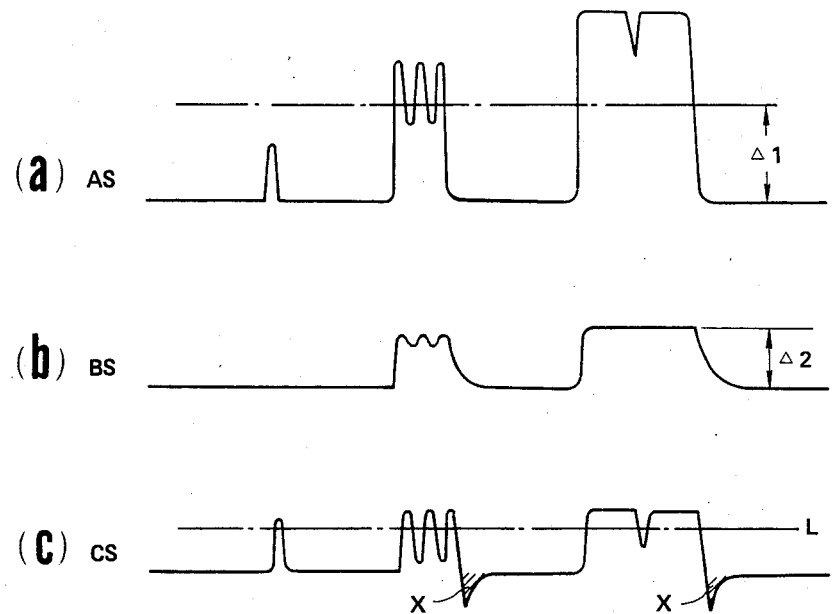
FIGS. 4a–4c and 5a–5d are timing charts for explaining the operation of the correction circuit shown in FIG. 2.

For this reason, a correction circuit has been provided at the preceding stage of a binarizing circuit for correcting the contrast of the picture image signal. FIG. 2 shows one example of a correction circuit comprising a subtraction circuit 10 and a correction signal forming circuit 20. The subtraction circuit 10 is constituted by an operational amplifier 11 and resistors 12, 13, 14 and 15 and functions to subtract an output signal BS outputted from the correction signal forming circuit 20 from a picture image signal AS. The correction signal forming circuit 20 is constituted by an integrating circuit made up of a resistor 21 and a capacitor 22, a first threshold value circuit made up of a diode 23 and a bias source 24, a transistor circuit made up of a transistor 25 and resistors 26 and 27, and a second threshold value circuit made up of a diode 28 and a bias source 29. The threshold values set by the first and second threshold value circuits define the lower limit and the upper limit respectively at a level region to be corrected of the input picture image signal AS so as to subject the input picture image signal AS to an integration processing in the defined region. The input/output chracteristics of the correction circuit are shown in FIG. 3 wherein Δ1 and Δ2 represent the threshold values set by the first and second threshold value circuits. Where a picture image signal AS as shown in FIG. 4a is applied to the correction circuit, the correction signal forming circuit 20 produces a signal BS whose level is limited and integrated as shown in FIG. 4b, while the subtraction circuit 10 outputs a corrected picture image signal CS as shown in FIG. 4c corresponding to the difference between the input picture image signal AS and the signal BS. As shown in FIG. 4c, this corrected picture image signal CS contains all components of the input picture image signal AS. Accordingly, when this signal CS is applied to a binarizing circuit, not shown, so as to binarize it with a threshold value L, it is possible to obtain a binarized picture image information containing all picture image informations.

With such a prior art level correction circuit, however, since the input picture image signal is integrated, when a subtraction operation is made with the subtraction circuit 10, the integrated component is also subtracted, whereby tails X are formed in the corrected picture image signal CS as shown by hatched portions in FIG. 4c. These tails result in the degradation in the reproduced picture image. For example, when a picture image including black vertical lines and a horizontal line which is integrated with the vertical lines as shown in FIG. 5a is scanned in a direction of arrow H to obtain a picture image signal AS, this signal AS would become as shown in FIG. 5b. When such picture image signal AS is corrected by the level correction circuit described above, the signal BS outputted from the correction signal forming circuit 20 would contain the integrated component, while the corrected picture image signal CS outputted from the subtraction circuit 10 would contain tails (shown by hatched portions) as shown in FIG. 5d. For this reason, when this signal CS is binarized with, for example, a threshold value L, the tails Y in the signal CS are lost so that a black picture image at this part would be judged as a white picture image. In other words, the horizontal line would be cut away.

Figure 6:
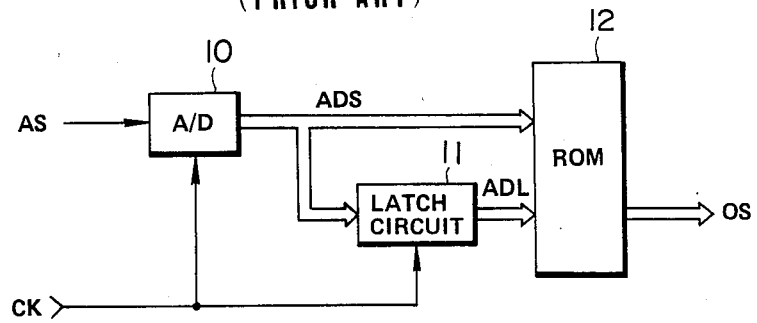
FIG. 6 is a block diagram showing another prior art level correction circuit.

In another prior art level correction circuit, the picture image signal level of a picture element to be corrected is corrected by quantizing the picture image signal of the picture element to be corrected and the picture image signal of a picture element one element before the picture element to be corrected at each picture element of the picture image signal. Fig. 6 shows one example of such correction circuit.

Figure 7:
FIG. 7 is a diagrammatic representation showing a manner of correction of the picture image signal level performed by the circuit shown in FIG. 1.

The circuit shown in FIG. 6 comprises an analog-/digital (A/D) converter 10 which sequentially quantizes an analog picture image signal AS obtained by scanning a manuscript with a reading-out unit at each picture element in accordance with a picture image clock CK thereby converting the quantized signals into a digital signal, a latch circuit 11 sequentially latching the digital picture image signal ADS outputted from the A/D converter 10 in accordance with the picture image clock CK, and a ROM 12 receiving the digital picture image signal ADS directly supplied from the A/D converter 10 and the digital image signal ADL supplied via the latch circuit 11 (the signal ADL corresponds to the digital picture image signal ADS of a picture element one element before the picture element corresponding to the digital picture image signal ADS supplied directly from the A/D converter 10), the signals ADS and ADL acting as address information, thereby producing a corrected digital picture image signal OS corresponding to the address informations. The ROM 12 executes the following calculation (Actually the result of calculation is written as a table corresponding to the address informations)

$$(-\tfrac{1}{2}ADL+ADS)\times 2$$

so as to correct the level of the digital picture image signal of the picture element to be corrected, that is, the level of the digital picture image signal ADS applied directly from the A/D converter 10. Consequently, where the signal level of the digital picture image signal ADS of the picture image to be corrected is 8 and where the signal level of the digital picture image signal ADL of a picture element which is one picture element before the picture element to be corrected is 4 as shown in FIG. 7, as a result of the calculation just described, the signal level of the corrected digital picture image signal OS becomes 12. In other words, as the values of these signal levels increase the level approaches the black level, whereas as the values decreases the levels approach the white level. Accordingly, in this case, the picture image signal ADS of the picture element to be corrected will be emphasized toward the black level. Where the levels of the signals ADS and ADL are equal, for example 8, the signal level of the corrected picture image signal OS would become 8, whereby the original level would be outputted as it is. So long as such circuit is used, tails of the picture image signal caused by integration would not occur as in the circuit shown in FIG. 2, and partial loss of the horizontal line would not occur.

In the prior art level correction circuit as shown in FIG. 6 where the difference in levels between the picture image signals of adjacent picture elements and the picture image signal of the picture element to be corrected is small, little correction would be made, whereby a picture image whose picture image signal level varies slowly, that is, a picture image of not clear contrast cannot be corrected efficiently.

As above described, the invention contemplates the provision of an improved binarizing system of picture image signals capable of preventing loss of the picture image and efficiently correct even such a picture image whose picture image level varies slowly.

Preferred embodiments of this invention will now be described.

A first embodiment of the binarizing circuit of this invention shown in FIG. 8 comprises an A/D converter 20 quantizing an input analog picture image signal AS and then converting the quantized signal into a digital signal, a plurality of (only 3 is shown in the drawing) latch circuits 21, 22, 23, which latches the digital picture image signal ADS outputted from the A/D converter 20 while serially shifting the signal ADS by one picture element in accordance with a picture element clock, and first and second ROMs 241 and 251 acting as calculating means. The first ROM 241 is connected to receive multivalue picture image signals $ADL_1$, $ADL_2$ and $ADL_3$ respectively latched by the latch circuits 21, 22, 23 as address informations. In the ROM 241, signals $C_1$ and $C_2$ whose levels become a maximum respectively toward the black level and the white level among digital picture image signals $ADL_1$, $ADL_2$ and $ADL_3$ are prestored in a region designated by the address informations in the form of a data table. Among the signals, signals corresponding to the received address informations are read out. The second ROM 251 receives the signals $C_1$ and $C_2$ read out from the first ROM 241 and the digital picture image signal ADS outputted from the A/D converter 20 as address informations to read out signals corresponding to the received address informations among the corrected digital picture image signals OS which are prestored in the form of a data table. The corrected digital picture image signals OS are determined by the following equations (1), (2), (3). More particularly, as above described, where the values of the levels of respective picture image signals are large, the level approaches to the black level, while where the level values are small, the level approaches to the white level. Suppose now that the signal $C_1$ has a maximum value toward the black level (hereinafter this signal is termed a maximum value signal) and that the signal $C_2$ has a maximum value toward the white, that is, it has a minimum signal level (hereinafter termed a minimum value signal), then when the picture image signal ADS, the maximum signal $C_1$ and the minimum value signal $C_2$ have a relation of $ADS \geq C_1, C_2$, a calculation $$OS = 2ADS - C_2 \qquad (1)$$

is executed so as to emphasize toward the black direction whereas when the relation is $C_1 > ADS \geq C_2$, a calculation $$OS = ADS \qquad (2)$$

is executed so as to maintain the level. Further, when $C_1, C_2 > ADS$, a calculation $$OS = 2ADS - C_1 \qquad (3)$$

is executed so as to emphasize toward the white level.

In the case of $ADS \geq C_1, C_2$, a black picture element in a white picture image would be emphasized, but in this case when equation (1) is used as it is, unwanted small signals such as noise component or the like would be emphasized. Accordingly, in this embodiment, for the purpose of eliminating the unwanted small signals, a threshold value CO is set for the picture image signal ADS so as to execute the calculation of equation (1) only when $$ADS \geq CO$$

and when $$ADS < CO$$

it is made $$OS = ADS$$

The following Table I shows one example of the corrected digital picture image signals OC calculated by these equations. Such data table as shown in Table I is prestored in the ROM 251, where the threshold value CO satisfies the following inequality.

$$CO \leq O$$

TABLE I

| $C_2$ | $C_1$ | ADS 0 | 1 | 2 | 3 | 4 | 5 |
|---|---|---|---|---|---|---|---|
| 0 | 0 | 0 | 2 | 4 | 6 | 8 | 10 |
| 0 | 1 | 0 | 2 | 4 | 6 | 8 | 10 |
| 0 | 2 | 0 | 1 | 4 | 6 | 8 | 10 |
| 0 | 3 | 0 | 1 | 2 | 6 | 8 | 10 |
| 0 | 4 | 0 | 1 | 2 | 3 | 8 | 10 |
| 0 | 5 | 0 | 1 | 2 | 3 | 4 | 10 |
| 1 | 1 | −1 | 1 | 3 | 5 | 7 | 9 |
| 1 | 2 | −2 | 1 | 3 | 5 | 7 | 9 |
| 1 | 3 | −3 | 1 | 2 | 5 | 7 | 9 |
| 1 | 4 | −4 | 1 | 2 | 3 | 7 | 9 |
| 1 | 5 | −5 | 1 | 2 | 3 | 4 | 9 |
| 2 | 2 | −2 | 0 | 2 | 4 | 6 | 8 |
| 2 | 3 | −3 | −1 | 2 | 4 | 6 | 8 |
| 2 | 4 | −4 | −2 | 2 | 3 | 6 | 8 |
| 2 | 5 | −5 | −3 | 2 | 3 | 4 | 8 |
| 3 | 3 | −3 | −1 | 1 | 3 | 5 | 7 |
| 3 | 4 | −4 | −2 | 0 | 3 | 5 | 7 |
| 3 | 5 | −5 | −3 | −1 | 3 | 4 | 7 |
| 4 | 4 | −4 | −2 | 0 | 2 | 4 | 6 |
| 4 | 5 | −5 | −3 | −1 | 1 | 4 | 6 |
| 5 | 5 | −5 | −3 | −1 | 1 | 3 | 5 |

For the purpose of preparing the Table I, it is assumed that the levels of signals ADS, $C_1$ and $C_2$ vary between 0 and 5. Actually, however, the Table is prepared by using a wider range of levels. Even when the range of the levels is widened, the levels of the corrected picture image signals OS can be set in the same manner as in Table I.

The corrected picture image signals OS read out from the second ROM 251 are applied to the binarizing circuit, not shown, of the second stage.

With the circuit construction shown in FIG. 8, the analog picture image signal AS sent from the read unit, not shown, is converted into, for example, a 4 bit digital picture image signal by A/D converter 20 at each picture element. Then, the signal ADS is sequentially inputted into three latch circuits 21, 22 and 23 at each picture element. The outputs of these latch circuits, that is, digital picture image signals ADL1, ADL2 and ADL3 of adjacent three picture elements are supplied to the first ROM 241 to act as address informations so that the first ROM 241 outputs the maximum value signal $C_1$ and the minimum value signal $C_2$ whose level becomes a maximum toward the white level and black level respectively among the multivalue picture image signals ADL1, ADL2 and ADL3. These maximum value signal $C_1$ and the minimum value signal $C_2$ are supplied to the second ROM 251 together with the digital picture image signal ADS outputted from the A/D converter 20 to act as the address informations. Consequently, the second ROM 251 outputs a corrected digital picture image signal OS applied with a weight corresponding to the levels of the maximum value signal $C_1$ and the minimum value signal $C_2$. More particularly, by the second ROM 251, the digital picture image signal ADS of the picture element to be corrected is corrected according to the level of the digital picture image signal of three picture elements positioned immediately before.

Figure 9:
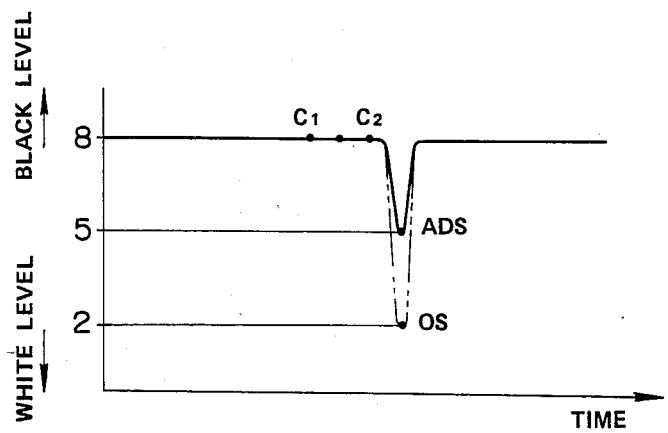
FIGS. 9a and 9b are timing charts showing a manner of correction of the picture image signal level performed by the level correction circuit shown in FIG. 8.
Figure 9:
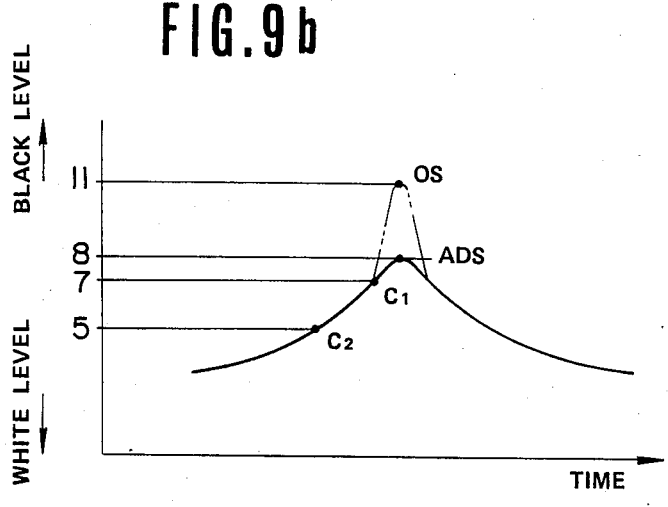

For example, where a picture image signal of a white point in a black line (When a multiplicity of these white points are continuously placed in the direction of the auxiliary scanning, a vertical fine white line in a black picture image is obtained) is obtained as shown in FIG. 9a, the white point is corrected as follows. For example, where the level of the digital picture image signal of the white point is 5 and where the levels of the maximum value signal $C_1$ and the minimum value signal $C_2$ which are selected by ROM 241 among the digital picture image signals of three picture elements at positions immediately before are both 8, since at this time $ADS<C_1, C_2$, the value calculated with equation (3), that is, $$OS = 2ADS - C_1$$
$$= 2 \times 5 - 8 = 2$$

is outputted from the second ROM 251 as the signal level of the digital picture image signal OS representing the white point after correction, and the white point is emphasized toward the white level.

Figure 5:
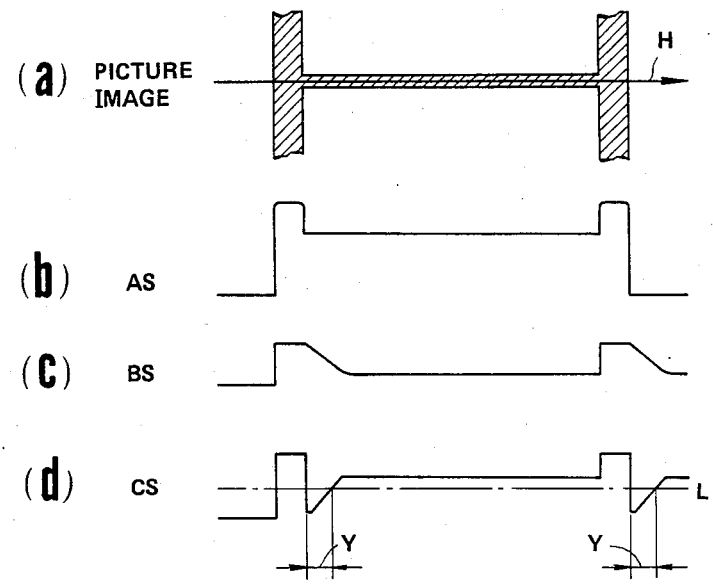

When a picture element to be corrected is a white picture element in a continuous black picture elements as shown in FIG. 9a, the level can be corrected efficiently as above described. However, as shown in FIG. 5, in a case wherein although a picture element to be corrected is a black picture element, the level of its picture image is lower than that of the picture image signal of certain number of black picture elements immediately before when the black picture element is read by a read unit and then quantized, the signal would be over corrected when equation (3) is applied so that the signal level would be emphasized toward the white level irrespective of the fact that the picture element to be corrected is a black picture element. As a result, when the picture image signal is binarized, it would be misjudged as a white picture element. However, according to this invention, since above described correction is made for each picture element unit of a quantized picture image signal, even when a phenomenon corresponding to a loss of a picture image occurs in one picture element, the next and following picture elements can be corrected normally so that there is no problem in practical use. Usually, the size of these picture element is set to about 12 bits/mm so that even if one of the picture elements is lost, no change will be perceived visually.

In a case of a picture image signal whose level varies slowly as shown in FIG. 9b, the following correction is made. Suppose now that a picture element having the maximum value of the image signal is the picture element to be corrected, that the level of the picture image signal ADS is 8, that the level of the maximum value signal $C_1$ selected by the ROM 241 among the digital picture image signals of three picture element immediately before the picture element having the maximum value is 7, and that the level of the minimum value signal $C_2$ is 5. Then, in this case, since $$ADS \geq C_1, C_2$$

under condition that $ADS \geq CD$, the value calculated with equation (1) becomes the corrected value. Thus OS becomes $$OS = 2ADS - C_2$$
$$= 2 \times 8 - 5 = 11$$

With the prior art correction circuit shown in FIG. 6, the level 8 of the picture image signal of the picture element to be corrected of a picture image whose signal level varies slowly is corrected to at most about 9.

As above described, according to this embodiment, it is possible not only to effectively prevent loss of teh picture image but also to apply a sufficiently large weight to a picture image signal whose signal level varies slowly so as to make clear the contrast.

FIG. 10 shows a level correction circuit incorporating another embodiment of the binarizing system embodying the invention in which elements corresponding to those shown in FIG. 8 are designated by the same reference charactors.

This embodiment is different from the previous embodiment in that the first ROM 242 selects only an output whose signal level changes towards the white level among the outputs from respective latch circuits and that the second ROM 252 addressed by the selected signal and the picture image signal of a picture element to be corrected and outputted from the A/D converter 20 is written with a corrected digital picture image signal which is calculated by $$OS = ADS$$

when the signals C and ADS have a relation $$ADS \geq C,$$
but when $ADS < C$ $$OS = 2ADS - C.$$

The following Table II shows an example of a table of the corrected picture image signals OS calculated by these equations.

TABLE II

| C | ADS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|----|----|----|----|----|----|
| 0 | | 0 | 1 | 2 | 3 | 4 | 5 | 6 | 7 | 8 | 9 | 10 | 11 | 12 | 13 | 14 | 15 |
| 1 | | 0 | 1 | 2 | 3 | 4 | 5 | 6 | 7 | 8 | 9 | 10 | 11 | 12 | 13 | 14 | 15 |
| 2 | | 0 | 0 | 2 | 3 | 4 | 5 | 6 | 7 | 8 | 9 | 10 | 11 | 12 | 13 | 14 | 15 |

TABLE II-continued

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 3 | 0 | 0 | 1 | 3 | 4 | 5 | 6 | 7 | 8 | 9 | 10 | 11 | 12 | 13 | 14 | 15 |
| 4 | 0 | 0 | 0 | 2 | 4 | 5 | 6 | 7 | 8 | 9 | 10 | 11 | 12 | 13 | 14 | 15 |
| 5 | 0 | 0 | 0 | 1 | 3 | 5 | 6 | 7 | 8 | 9 | 10 | 11 | 12 | 13 | 14 | 15 |
| 6 | 0 | 0 | 0 | 0 | 2 | 4 | 6 | 7 | 8 | 9 | 10 | 11 | 12 | 13 | 14 | 15 |
| 7 | 0 | 0 | 0 | 0 | 1 | 3 | 5 | 7 | 8 | 9 | 10 | 11 | 12 | 13 | 14 | 15 |
| 8 | 0 | 0 | 0 | 0 | 0 | 2 | 4 | 6 | 8 | 9 | 10 | 11 | 12 | 13 | 14 | 15 |
| 9 | 0 | 0 | 0 | 0 | 0 | 1 | 3 | 5 | 7 | 9 | 10 | 11 | 12 | 13 | 14 | 15 |
| 10 | 0 | 0 | 0 | 0 | 0 | 0 | 2 | 4 | 6 | 8 | 10 | 11 | 12 | 13 | 14 | 15 |
| 11 | 0 | 0 | 0 | 0 | 0 | 0 | 1 | 3 | 5 | 7 | 9 | 11 | 12 | 13 | 14 | 15 |
| 12 | 0 | 0 | 0 | 0 | 0 | 0 | 0 | 2 | 4 | 6 | 8 | 10 | 12 | 13 | 14 | 15 |
| 13 | 0 | 0 | 0 | 0 | 0 | 0 | 0 | 1 | 3 | 5 | 7 | 9 | 11 | 13 | 14 | 15 |
| 14 | 0 | 0 | 0 | 0 | 0 | 0 | 0 | 0 | 2 | 4 | 6 | 8 | 10 | 12 | 14 | 15 |
| 15 | 0 | 0 | 0 | 0 | 0 | 0 | 0 | 0 | 1 | 3 | 5 | 7 | 9 | 11 | 13 | 15 |

With the construction, only the white component in the black picture image is corrected and this is sufficient for practical use. Moreover, according to this modification, the capacity and cost of the second ROM 252 can be reduced.

FIG. 11 illustrates still another embodiment of this invention. Although in the previous embodiments continuous picture elements immediately before a picture element to be corrected are utilized as reference picture elements and their picture image signals are applied to first ROM 241 or the second ROM 242, according to the embodiment shown in Fig. 11, latch circuits 31, 32 and 33 are added and a picture element on the same main scanning line as a picture element to be corrected at a position before the same is discontinuously taken in as a reference picture element. Especially, in the embodiment shown in FIG. 11, alternate picture elements before the picture element to be corrected are utilized as the reference picture elements and their picture image are latched in the latch circuits 21, 22 and 23, respectively. Among the picture image signals $ADL_1$, $ADL_2$ and $ADL_3$ of the alternate picture elements thus latched, a signal $C_1$, the level thereof becoming a maximum, and a signal $C_2$, the level thereof becoming a minimum, are selected by the first ROM 241. Of course, the embodiment shown in FIG. 11 can be applied to that shown in FIG. 10 so as to select the signal $C_1$ whose level becomes a minimum. Even with such modification, the same advantageous effects as the foregoing embodiments can be realized.

It should be understood that the invention is not limited to the specific embodiments described above. For example, the number of picture element signals of the picture image applied to the first ROM may be four or more instead of 3. Furthermore, a shift register can be substituted for the latch circuits for temporarily storing signals. Other calculating means and methods may be used without departing the true spirit and scope of the invention as defined in the appended claims. Particularly, with respect to the first and second ROMs, they may be replaced with a single ROM or any other means as long as it is capable of executing a first calculation for selecting either one of the extracted picture image signals whose levels are a maximum and a minimum and a second calculation for effecting a level correction on the picture image signal of the picture element to be corrected for emphasizing nature of tone of said picture image in the manuscript based on the level of said selected picture image and the level of the picture image of said picture element to be corrected.

What is claimed is:

1. A system for binarizing quantized picture elements obtained by scanning a picture image comprising:
    first means for selecting a picture element to be binarized;
    second means for selecting at least two additional picture elements located in said picture image in the immediate vicinity of said selected picture element;
    third means for identifying at least one of the maximum and minimum levels of said additional picture elements;
    fourth means for adjusting the level of said selected picture element to be binarized as a function of both the level of said selected picture element and said at least one of said maximum and minimum levels of said additional picture elements to emphasize the nature of the tone of said selected picture element; and
    fifth means for binarizing said adjusted level of said selected picture element according to a predetermined threshold value.

2. A system of claim 1 wherein said third and fourth means each comprise a separate means for calculating.

3. A system of claim 1 wherein said third and fourth means each comprise a respective read only memory.

4. A system according to claim 1 wherein said third means selects both the maximum and minimum levels of said additional picture elements, and said fourth means executes the calculations;

$$OS = 2ADS - C_2$$

when $ADS \geq C_1, C_2$;

$$OS = ADS$$

ps when $C_1 > ADS \geq C_2$; and $$OS = 2ADS - C_1$$

when $C_1, C_2 > ADS$, where $C_1$ represents the level of said additional picture elements having a maximum signal level, $C_2$ represents the level of said additional picture elements having a minimum signal level, ADS represents the level of said selected picture element to be binarized, and OS represents the adjusted level of said selected picture element.

5. A system according to claim 4 wherein said fourth means sets a second predetermined threshold level having a level CO when $ADS \geq C_1$, $C_2$, and, when $ADS \geq C$, $C_2$ said fourth means executes a calculation:

$$OS = 2ADS - C_2$$

only when $ADS \geq CO$, and executes a calculation:

$$OS = ADS$$

when $ADS < CO$.

6. A system according to claim 4 or 5 wherein said third means comprises a first ROM (read only memory) in which the level $C_1$ of the additional picture element whose level is a maximum and the level $C_2$ of the additional picture element whose level is a minimum are prestored as a table, said at least two additional picture elements are applied to said first ROM as address information to read out corresponding levels $C_1$ and $C_2$, and said fourth means comprises a second ROM in which picture image signals representing said adjusted level OS of said selected picture element are prestored as a table, with said levels $C_1$ and $C_2$ read out from said first ROM and said selected picture element applied to said second ROM as address information to read out said adjusted level OS.

7. A system according to claim 1 wherein said second means selects consecutive picture elements located in said image on the same line and immediately before said selected picture element to be binarized.

8. A system according to claim 7 wherein said second means comprises a plurality of latch means which temporarily latch said quantized picture elements while sequentially shifting the same according to a picture image clock.

* * * * *